US008491376B1

(12) United States Patent
Di Carlo

(10) Patent No.: US 8,491,376 B1
(45) Date of Patent: Jul. 23, 2013

(54) SLOT GAME WITH ADDITIONAL SKILL ELEMENT

(76) Inventor: Fernando Di Carlo, Woodbridge (CA)

( * ) Notice: Subject to any disclaimer, the term of this patent is extended or adjusted under 35 U.S.C. 154(b) by 227 days.

(21) Appl. No.: 13/077,841

(22) Filed: Mar. 31, 2011

(51) Int. Cl.
*A63F 13/00* (2006.01)

(52) U.S. Cl.
USPC .......... 463/20

(58) Field of Classification Search
USPC .......... 463/20
See application file for complete search history.

(56) References Cited

U.S. PATENT DOCUMENTS

| | | | |
|---|---|---|---|
| 6,165,070 | A | 12/2000 | Nolte |
| 7,179,166 | B1 | 2/2007 | Abbott |
| 7,192,346 | B2 | 3/2007 | Mathis |
| 2003/0119576 | A1 | 6/2003 | McClintic |
| 2004/0048659 | A1 | 3/2004 | Seelig |
| 2004/0116173 | A1 | 6/2004 | Baerlocher |
| 2006/0040717 | A1 | 2/2006 | Lind |
| 2006/0281509 | A1 | 12/2006 | Arias-Vargas |
| 2008/0119261 | A1 | 5/2008 | Heymann |
| 2010/0120502 | A1 | 5/2010 | Oberberger |

*Primary Examiner* — Arthur O. Hall
*Assistant Examiner* — Jeffrey Wong
(74) *Attorney, Agent, or Firm* — Muskin & Cusick LLC

(57) ABSTRACT

A method, apparatus, and computer readable storage to implement a slot machine (or other game) with a skill element. After reels on the slot machine are spun (or cards are dealt; wheel is stopped, etc.) a potential award is computed (e.g., a main game outcome is determined and a potential prize is displayed that can be won) based on the symbol combinations present on active paylines (or cards dealt, etc.) Then a skill element is presented to the player wherein the player uses hand-eye coordination, timing and dexterity to employ mechanical skill to stop a moving icon in order to maximize the player's award. Once the icon is stopped, a percentage is determined based on a location of the stopped icon, and this percentage is applied to the potential award to determine the actual award. The actual award is then awarded to the player.

15 Claims, 15 Drawing Sheets

SLOT GAME WITH ADDITIONAL SKILL ELEMENT

BACKGROUND OF THE INVENTION

1. Field of the Invention

The present general inventive concept is directed to a method, apparatus, and computer readable storage medium directed to a slot machine game.

2. Summary of the Invention

It is an aspect of the present invention to provide an exciting skill based slot machine game.

The above aspects can be obtained by a method that includes (a) providing an input device, an output device, and a processing unit operationally connected to the input device and the output device; (b) executing instructions on the processing unit to perform a following operations: (c) receiving a command by a player to activate a game; (d) completing the game on the output device to a game outcome; (e) determining a potential award based on the game outcome; (f) animating an icon until the player presses a stop button which causes the icon to become a frozen icon; (g) determining an earned percentage based on a position of the frozen icon; (h) computing an actual award by applying the earned percentage to the potential award; and (i) awarding the player the actual award.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
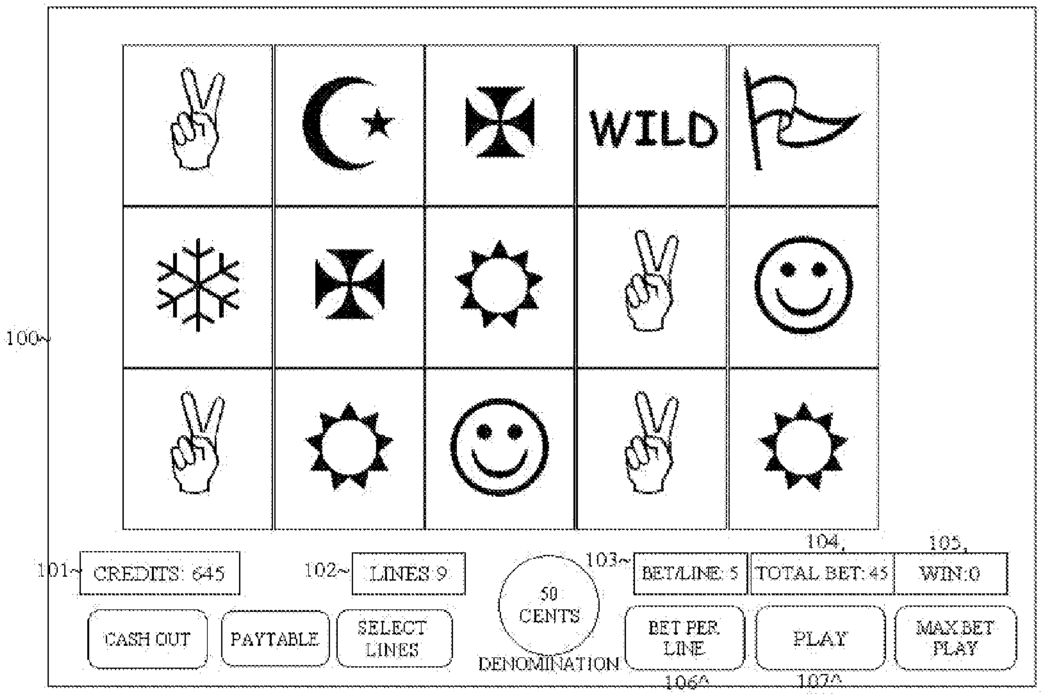
FIG. 1 is a drawing of a slot machine game when a player makes a bet, according to an embodiment.

Reference will now be made in detail to the presently preferred embodiments of the invention, examples of which are illustrated in the accompanying drawings, wherein like reference numerals refer to like elements throughout.

The present inventive concept relates to a method, apparatus, and computer readable storage medium to implement a slot machine game that incorporates a skill aspect. A typical slot machine game can be implemented, for example as described in U.S. Pat. No. 7,749,063, which is incorporated by reference herein in its entirety. As known in the art, a player makes a wager (using credits which can be exchanged for cash) and spins reels on a slot machine. The reels stop at random positions, and certain predetermined combinations on active paylines (each payline is predetermined line of symbols) will win awards (combinations that are not predetermined combinations do not pay awards). A payout (award) made to the player is the respective award for each active (bet on) payline added together.

Typically, when reels stop spinning and the reels form predetermined combinations, the player wins a respective award which is added to the player's credit meter (which can be cashed out at any point in time by the player). According to the present inventive concept, the after the reels stop spinning the amount the player would win (all awards for all active paylines) is considered a "potential win" and is not yet awarded the player. The player then plays a skill game (element) in which the player tries to earn 100% of the potential win by manipulating physical controls in order to achieve a goal. If the player completes the goal perfectly the player will win 100% of the potential win. If the player does not complete the goal perfectly, the player will win less than 100% of the potential win.

Some jurisdictions only allow wagering on games of skill Thus, the skill element as described herein would add an element of skill to a traditional slot machine game, or any other potential game that awards a prize (e.g., video poker, bingo, keno, etc.)

FIG. 1 is a drawing of a slot machine game when a player makes a bet, according to an embodiment.

An electronic output device 100 displays the game. A credit meter 101 shows how many credits the player currently has. A line meter 102 shows how many paylines (lines) the player bets on (in this example game the game has a maximum of 9 lines). A bet per line meter 103 shows how many credits per line the player is betting on. A total bet meter 104 shows the player's total bet (typically this amount is equal to the bet per line multiplied by the number of lines bet). A win meter 105 shows how many credits the player has won on the last spin. A bet per line button 106 allows the player to set his or her bet per line (e.g., number of credits per line). A play button 107 allows the player to play (spin the reels using the parameters the player has chosen).

Figure 2:
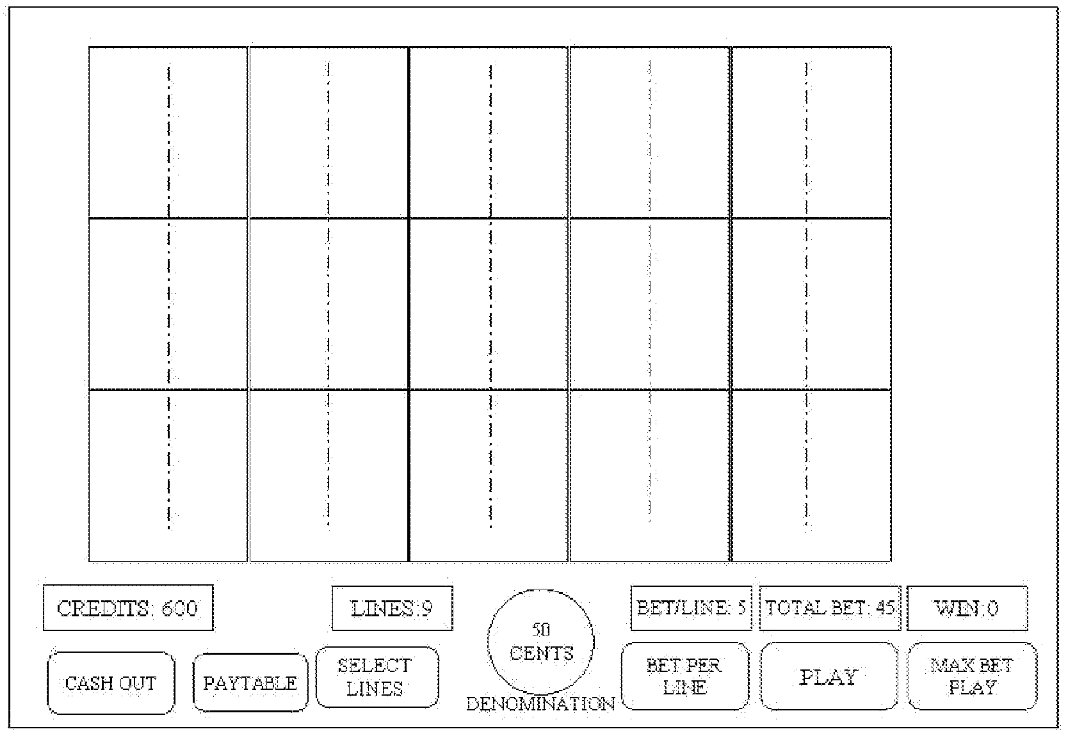
FIG. 2 is a drawing of a slot machine game when the player spins the reels, according to an embodiment.

FIG. 2 is a drawing of a slot machine game when the player spins the reels, according to an embodiment.

After the player presses the play button 107 in FIG. 1, the reels spin as illustrated in FIG. 2. The spin typically lasts for about a second and each of the five reels stops at a random position. Each reel can have a predetermined number of symbols on it, for example 24, 36 or any other number. Reels can be physical (mechanical) or virtual (displayed on an electronic output device).

Figure 3:
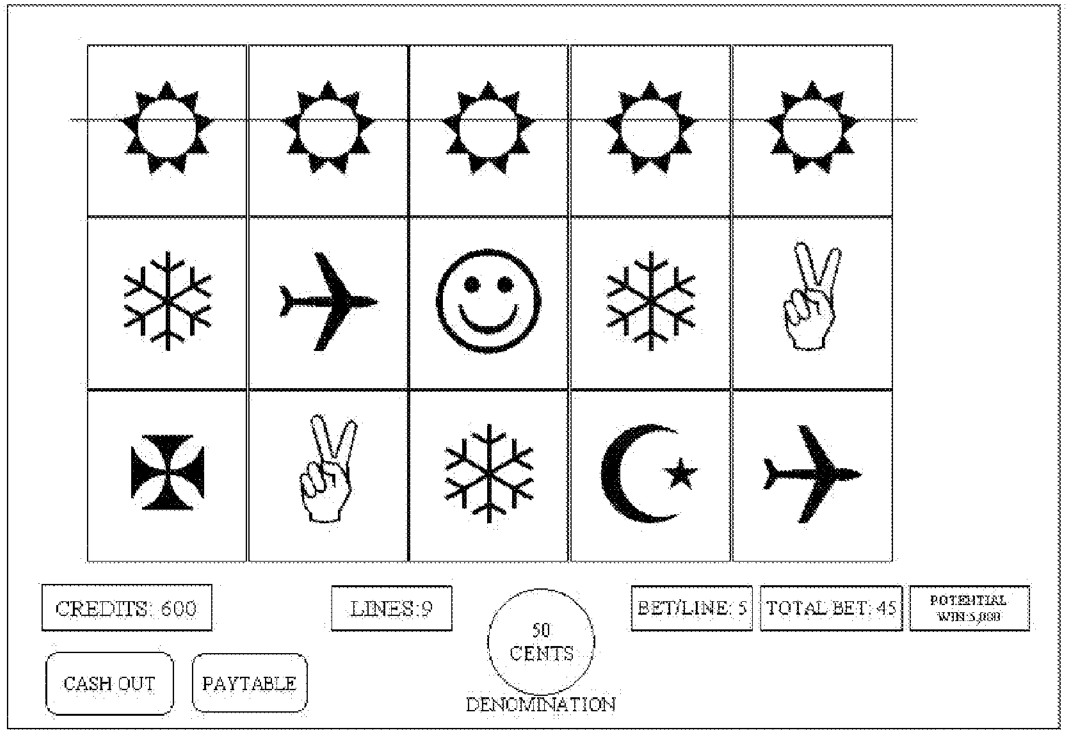
FIG. 3 is a drawing of a slot machine game after the spin is complete, according to an embodiment.

FIG. 3 is a drawing of a slot machine game after the spin is complete, according to an embodiment.

After the reels spin, the come to a stop as illustrated in FIG. 3. Here the player has bet on all nine paylines (see FIG. 11), with five coins bet per line. The player has achieved one winning payout (line 1, FIG. 11) for a potential win of $5,000 ($1,000 times 5 coins bet per line). However, unlike a traditional slot machine game, the player is not yet awarded this (or any award). The player will play a skill game in order to earn as much of the $5,000 as possible.

Figure 4:
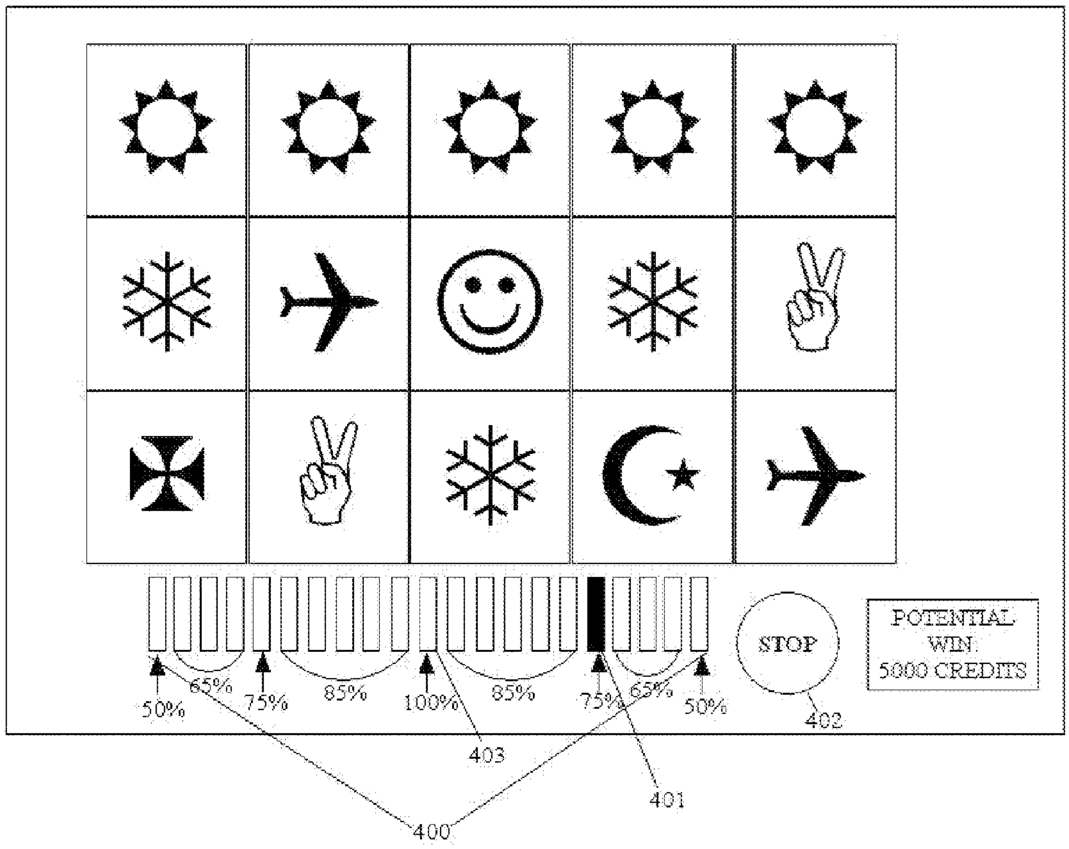
FIG. 4 is a drawing of a slot machine game when a skill game is initiated, according to an embodiment.

FIG. 4 is a drawing of a slot machine game when a skill game is initiated, according to an embodiment.

A skill meter 400 is displayed which shows 21 discrete bars (although any number of bars can be used). One of these bars is a highlighted bar 401. The highlighted bar 401 appears in a different color (or shape, etc.) than the other bars.

The highlighted bar will move (animate) back and forth in a "ping pong" fashion from left to right back to left again, etc. The highlighted bar will move to the right and when it reaches the rightmost bar it will change direction and move to the left and when it reaches the leftmost bar it will change direction again and move back to the right. This animation will repeat indefinitely until the player presses the stop button 402. Typically, the highlighted bar will remain highlighted for a fixed amount of time (e.g., two tenths of a second) before the highlighted bar becomes the next bar. When the stop button 402 is pressed, the highlighted bar no longer will move and will remain "frozen" so the player can see where the highlighted bar is.

It is the player's goal to press the stop button 402 (by touching the stop button 402 on a touch screen, or pressing a physical button on the device, or clicking a mouse, etc.) when the highlighted bar is the center bar 403. If the player presses the stop button 402 when the highlighted button is the center bar 403 then the player wins 100% of the potential award. The location of the highlighted bar when the player presses the stop button 403 determines the percentage of the potential award that the player wins (the actual award). Typically, the further away from the center that the highlighted bar is when the stop button 402 is pressed the lower the percentage of the potential award that the player gets (the actual award)

Thus, a player with quick reflexes (and good hand-eye coordination) may be able to stop the highlighted bar at or close to the center (winning the biggest percentage of the potential award), while a player with slow reflexes (and poor hand/eye coordination) will fare worse than the skilled player.

Table I below illustrates the different possible locations of the highlighted bar (after the stop button is pressed) and the respective percentage of the potential award the player would win (actual award) at that position. Of course, this represents merely one example and it can be appreciated that other configurations of payout percentages and their respective locations/ranges of the bars can be used. In addition, in an alternate embodiment, certain location(s) of the highlighted bar could pay more than 100% of the potential award. In addition to a linear bar, other shapes of the moving bar could be used as well (e.g., circle, etc.) While not pictured in Table I, certain position(s) could have a 0 award (the player wins nothing), e.g., position 1 has an award of 0 instead of 50%.

TABLE I

| position | % of potential award |
|---|---|
| 1 | 50 |
| 21 | |
| 2-4 | |
| 18-20 | 65 |
| 5 | 75 |
| 17 | |
| 6-10 | 85 |
| 12-16 | |
| 11 | 100 |

Figure 5:
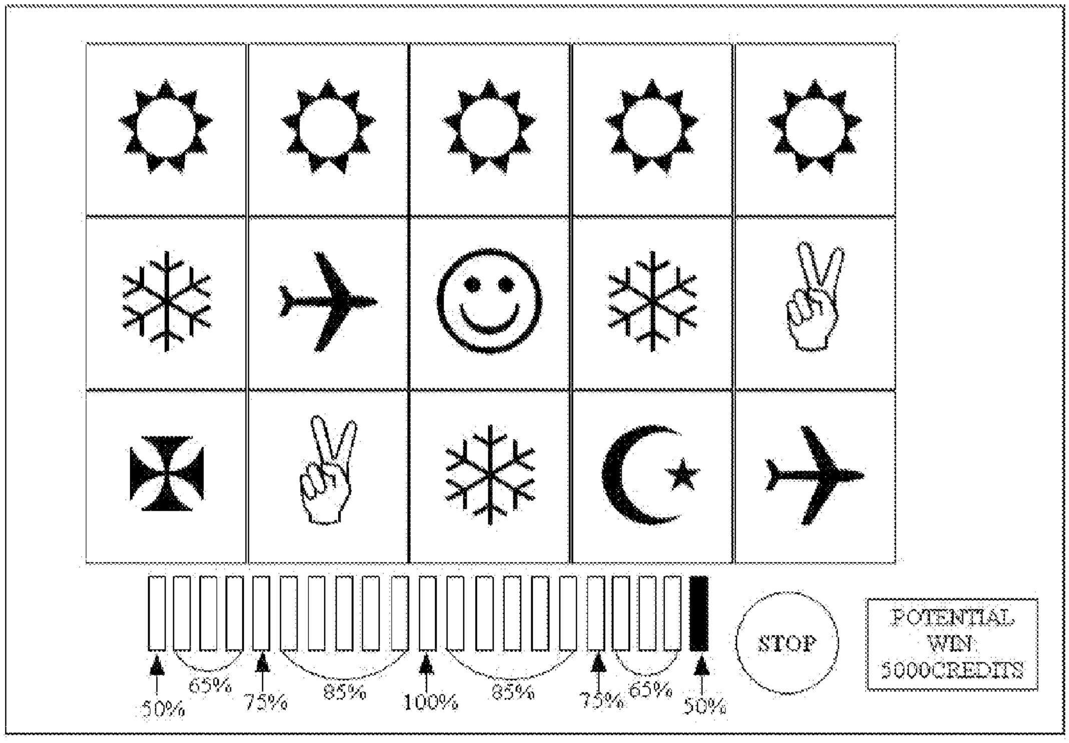
FIG. 5 is a drawing of a slot machine game when an animated bar has moved to the right, according to an embodiment.

FIG. 5 is a drawing of a slot machine game when an animated bar has moved to the right, according to an embodiment.

The highlighted bar has moved to the rightmost position on the skill meter and then will reverse direction and start moving again to the left. It is noted that while FIG. 4 showed the highlighted bar at position 17 and FIG. 5 shows the highlighted bar at position 21, the computer would also show the highlighted bar moving through positions 18-20 as well, but figures showing the highlighted bar at these positions (and all the other unillustrated positions as well) are omitted for simplicity. The player can press the stop button when the highlighted bar is at any of the possible positions.

Figure 6:
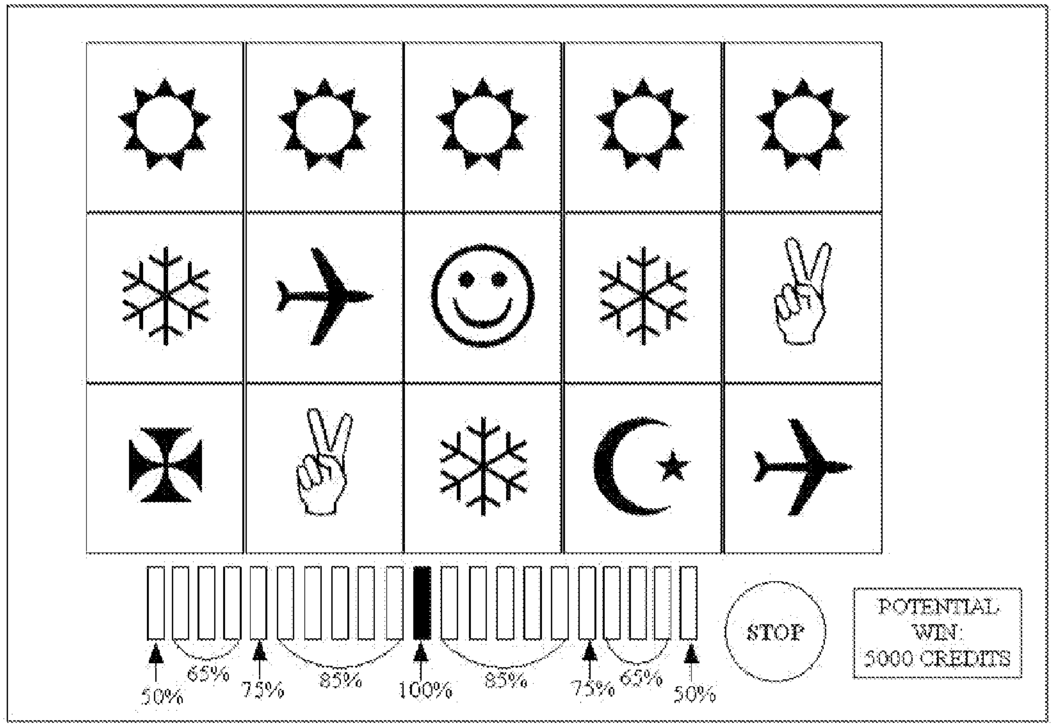
FIG. 6 is a drawing of a slot machine game when the animated bar has moved to the left, according to an embodiment.

FIG. 6 is a drawing of a slot machine game when the animated bar has moved to the left, according to an embodiment.

In FIG. 6, the bar is now moving to the left. If the player were able to press the stop button at this position (where the highlighted bar is in the center), the player would win an actual award of 100% of the potential award ($5,000). Of course, this is the player's goal.

Figure 7:
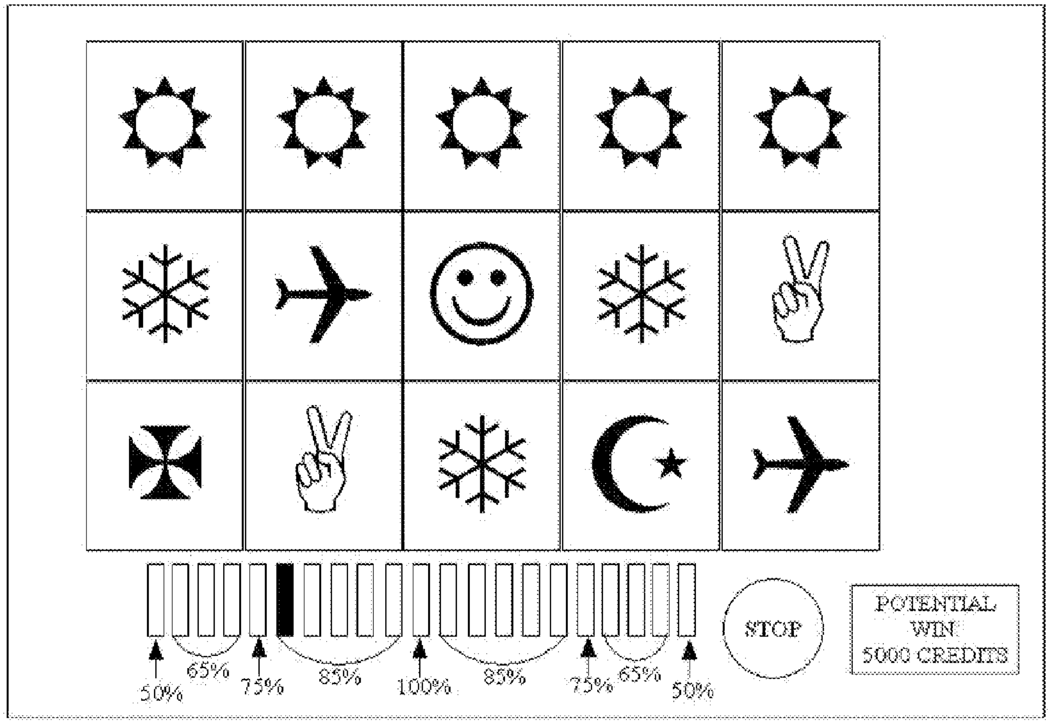
FIG. 7 is a drawing of a slot machine game when the animated bar has moved further to the left, according to an embodiment.

FIG. 7 is a drawing of a slot machine game when the animated bar has moved further to the left, according to an embodiment.

FIG. 7 shows the highlighted bar continuing to move to the left. As stated above, the computer would show the highlighted bar moving through each of the positions, but drawings showing the highlighted bar at each individual position is omitted for simplicity.

Figure 8:
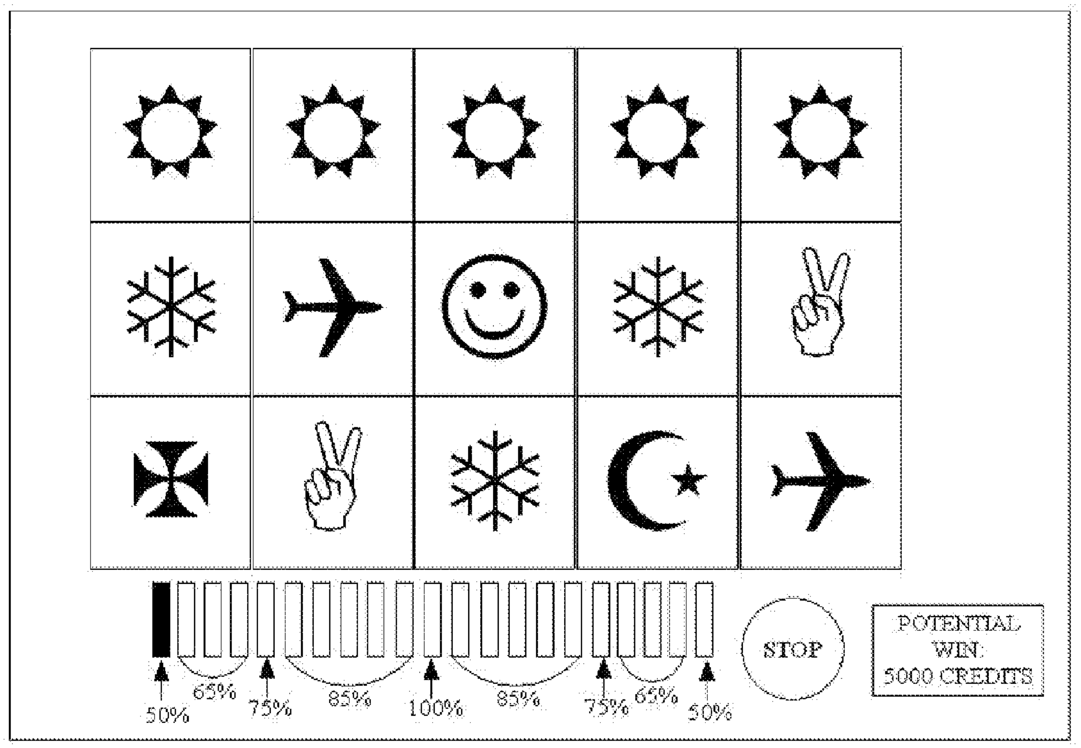
FIG. 8 is a drawing of a slot machine game when the animated bar has moved to the leftmost position, according to an embodiment.

FIG. 8 is a drawing of a slot machine game when the animated bar has moved to the leftmost position, according to an embodiment.

The highlighted bar is now at the leftmost position. The player would not wish to press the stop button at this position as the player would win the lowest possible award (50% of the potential award or $2,500). In an embodiment, stopping the highlighted bar in the wrong position could result in zero award.

Figure 9:
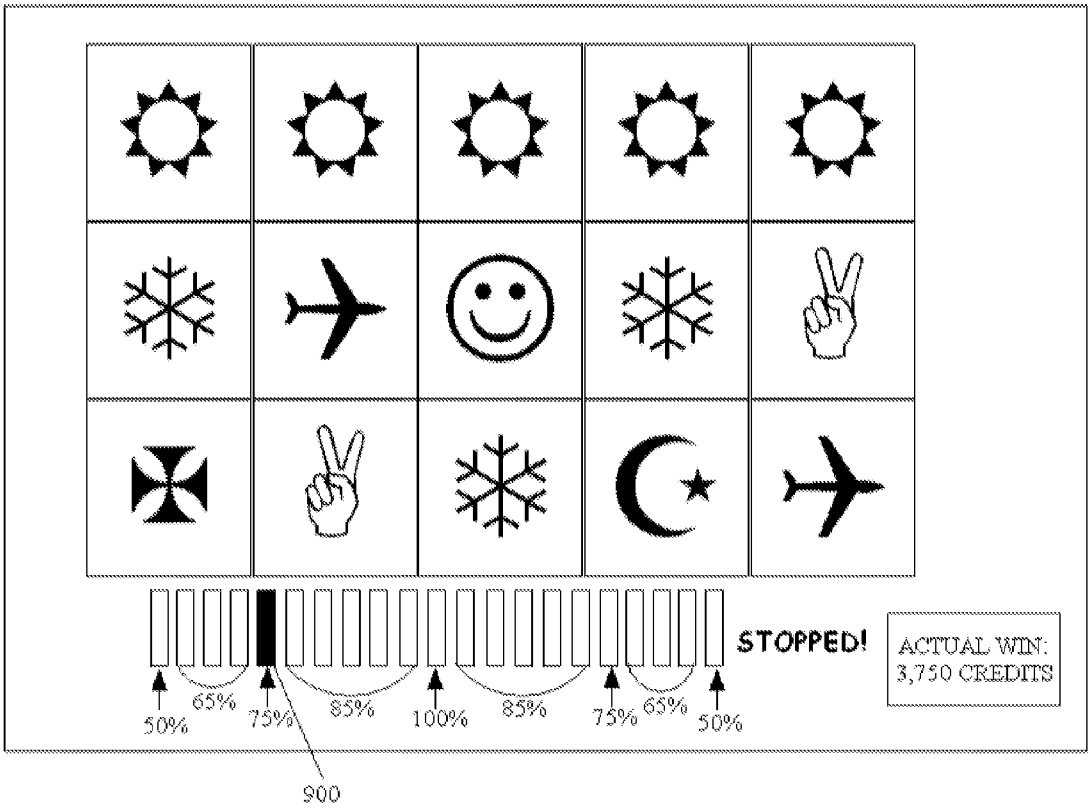
FIG. 9 is a drawing of a slot machine game when the animated bar is stopped by the player, according to an embodiment.

FIG. 9 is a drawing of a slot machine game when the animated bar is stopped by the player, according to an embodiment.

The highlighted bar is at the fifth position when the player presses the stop button. Once the stop button is pressed, the stop button is removed and can no longer be pressed. The highlighted bar 900 now freezes in position and can also be considered a frozen bar 900 (since it will no longer move). Since the highlighted (frozen) bar is in position five, according to Table I the player wins 75% of the potential award ($5,000), or 3,750 credits. This screen can remain until the player presses the screen (or other action) so that the player can inspect the skill meter and understand what has happened.

Figure 10:
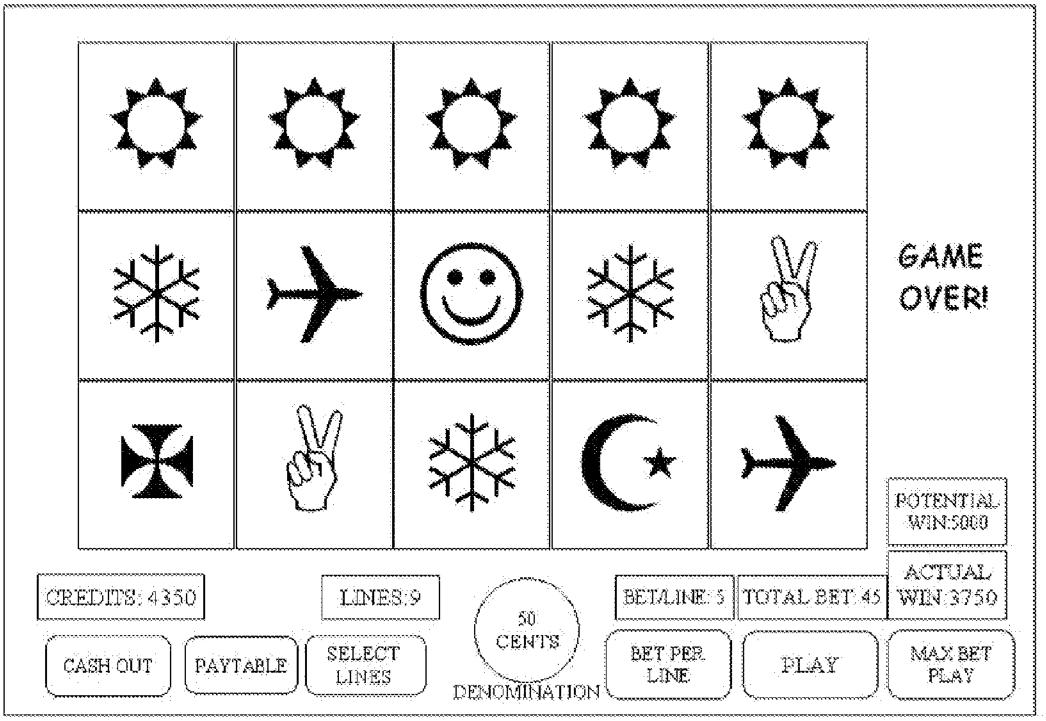
FIG. 10 is a drawing of a slot machine game after the game is completed, according to an embodiment.

FIG. 10 is a drawing of a slot machine game after the game is completed, according to an embodiment.

In FIG. 10, the game is over and the player's actual award of 3,750 credits is added to the credit meter. The player can now play a new game by pressing the "play" button (which would use the paylines/bet amount from the prior spin) or the "max bet play" button (which automatically bets the maximum bet and paylines), which would spin the reels again.

In an alternate embodiment, instead of the player trying to stop the highlighted bar in the center of the skill meter, other configurations of the skill meter can be used, for example one wherein the player tries to stop the highlighted bar in the rightmost or leftmost (or any other) bar. Table II below represents a configuration wherein the player tries to stop the highlighted bar at the rightmost position (bar). In this configuration, the skill meter has 30 bars (numbered 1 to 30 from the left) wherein the player will of course try to stop the highlighted/frozen bar on the rightmost (thirtieth) bar. Note that in this example, the player can earn an actual award of 101% of the potential award if the player stops the highlighted bar in the rightmost ($30^{th}$) position (in other words the frozen bar is in position 30).

TABLE II

| position | % of potential award |
|---|---|
| 1-5 | 50 |
| 6-15 | 65 |
| 16-25 | 75 |
| 26-28 | 85 |
| 29 | 100 |
| 30 | 101 |

It is further noted that the skill meter is not limited to a horizontal moving highlighted bar but alternatively can be presented as a set of vertical bars in which the highlighted bar moves up and down vertically (or even diagonally). As an alternative to using bars, any other type of icon can be used as well.

Figure 11:
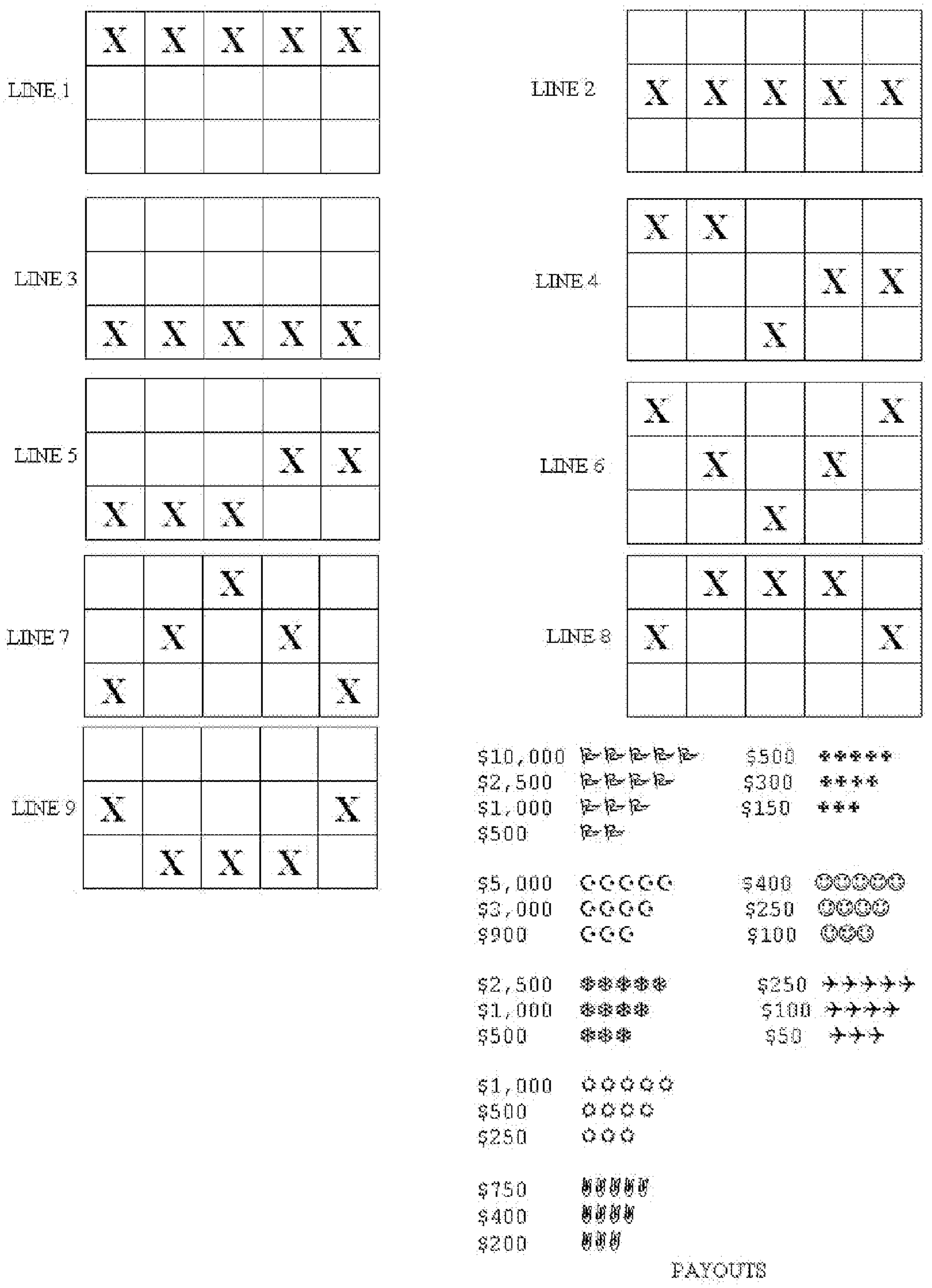
FIG. 11 is a drawing of exemplary rules for a slot game, according to an embodiment.

FIG. 11 is a drawing of exemplary rules for a slot game, according to an embodiment.

Shown are nine paylines for the game (the player is free to bet on 1-9 paylines at the player's option). Of course other numbers of paylines can be used (from 1-243 paylines), and the symbols forming each payline can be chosen by the game designers using any desired configuration.

Also shown is a paytable which can be used to determine awards for each active payline (payline the player has bet on). Payouts are typically paid from left to right, in other words, the leftmost symbol must start a combination. Of course, these payouts are just illustrated as an example, and any other set of payouts can be used. No representation is made that the payouts presented herein are mathematically proper.

Furthermore, the application of the skill element as described herein is not limited to a five reel slot game but can be applied to any type of slot game (e.g., 3 reel, 3×3 grid, etc.) or non-slot game (video poker) or virtually any type of wagering game at all. In addition, the present inventive concept is not limited to using the skill element described herein (the skill meter) and other mechanisms of introducing player skill can be used as well. Such mechanisms would presented an animated icon in which the player would be required to press one or more buttons (real of virtual) in order to effectuate a game action on the game which has a cause/effect relationship of determining a final state of the skill element which then determines a percentage of a potential award to actually award to the player.

Figure 12:
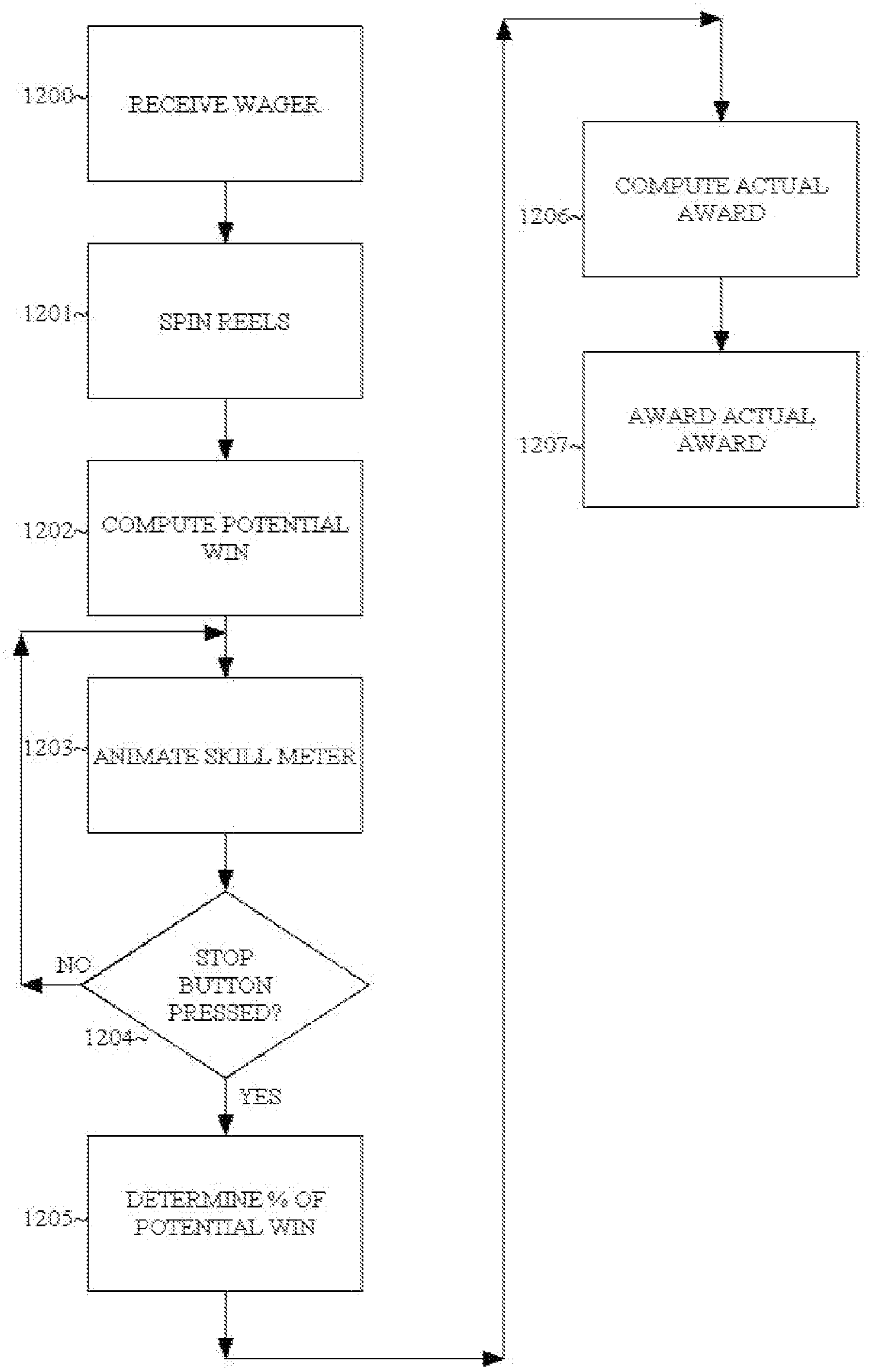
FIG. 12 is a flowchart illustrating an exemplary method of implementing a slot machine game incorporating a skill element, according to an embodiment.

FIG. 12 is a flowchart illustrating an exemplary method of implementing a slot machine game incorporating a skill element, according to an embodiment.

The method can begin with operation 1200, which receives a wager from a player. This can be done as known in the art. Typically, the player first funds the machine by providing a source of credits to the machine which the player converts to credits. The source of credits can be cash, electronic funds, a card which contains sweepstakes points, a cashless ticket/voucher, or any other known method.

If the wager made is in the form of Sweepstakes points, then a respective number of sweepstakes points (instead of credits) are deducted from a player's account. The account can be stored in an electronic database which stores a player's respective number of available sweepstakes points. When sweepstakes points are used, winnings are not in the form of sweepstakes points but credits which can be exchanged by the player for cash (or prizes). Thus, in this embodiment, there are two quantities (Sweepstakes points which are used for wagering and credits which are used for redemption). The player pays Sweepstakes points to play but wins awards in the form of credits. This is different to the traditional method of wagering described herein in which wagers are made using credits and awards are paid using credits.

Once the machine has credits, the player makes a wager by indicating (using buttons) how much the player wishes to bet. When the player wants to finally place the wager, the player issues a command (e.g., presses a button) which places the wager (and the wager amount is then deducted from the player's credit meter).

From operation 1200, the method proceeds to operation 1201, which spins the reels. Typically, the electronic output device will display a "reel blur" indicating that the reels are spinning. The reels will automatically stop at random positions after typically 1-2 second of spinning.

From operation 1201, the method proceeds to operation 1202, which computes a potential win (or potential award). The potential win is computed as the sum of each award for each active payline. Each award is determined by comparing the symbols falling under that respective payline against a paytable (see FIG. 11) to determine a respective payout, and the award is determined by multiplying the payout by the number of credits (coins) bet per payline. Combinations which are not listed as winning combinations are losing combinations, and paylines with losing combinations have an award amount of zero.

The potential award is displayed but not yet awarded to the player as the player must enter the skill element (operations 1203-1206) in order to determine the actual award (which is a function of the potential award).

From operation 1202, the method proceeds to operation 1203, which moves the highlighted bar one position to the next position. If the highlighted bar reaches the end of the skill meter, then the direction of the highlighted bar will reverse and proceed in the opposite direction. Technically, the highlighted bar is moved by highlighted the next position and removing the highlight for the current position. The current position now becomes the next position.

From operation 1203, the method proceeds to operation 104, which determines if the stop button is pressed. If not, the method returns to operation 1203. If the stop button is pressed, then the method proceeds to operation 1205. It is noted that in an optimal embodiment, after a predetermined and excessive amount of time has passed before the player has pressed the stop button (e.g., 10 minutes), the game can automatically stop the bar (either at a random time or to award the minimum percentage possible) in order to avoid an infinite loop.

In operations 1203-1204, the highlighted bar is moved back and forth repeatedly until the stop button is pressed. The speed of the moving bar is fast enough so that it would not be easy for the typical person to stop it in a particular location. However, the speed is slow enough that the average player's mechanical skill would still give the player an advantage in stopping the highlighted bar in the desired location (or a position near the desired location) as compared to the bar stopping in a purely random location. The speed the highlighted bar moves is constant, although in an alternative embodiment the speed can change. As the player improves their hand-eye coordination, the potential to stop the indicator at the ultimate stop position improves, thus giving the skilled player a higher potential to win than the lesser skilled player.

From operation 1204, if the stop button is pressed the method proceeds to operation 1205, which determines a percentage of the potential win to award the player. This is determined as a function of the location of the highlighted (now frozen) bar. A table such as that illustrated in Table I or II (or any other configuration) can be used.

From operation 1205, the method proceeds to operation 1206, which computes the actual award to award the player. Once the percentage of the potential award is determined from operation 1205, this percentage is applied to the potential award to determine the actual award (e.g., if the potential award is 100 credits and the percentage is 50%, then the actual award is 50 credits).

From operation 1206, the method proceeds to operation 1207, which awards the actual award (computed in operation 1206) to the player. This typically entails adding the actual award (which is also displayed to the player) to the player's credit meter.

Figure 13:
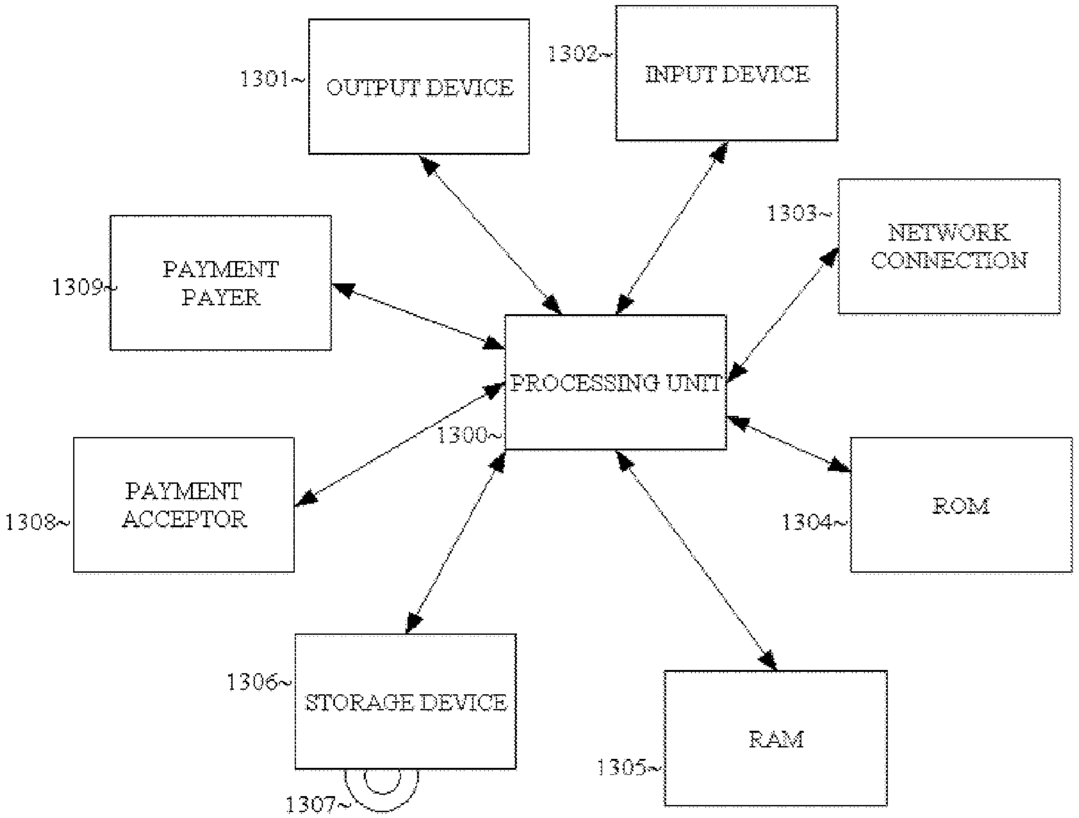
FIG. 13 is a block diagram illustrating exemplary hardware that can be used to implement the present invention, according to an embodiment.

FIG. 13 is a block diagram illustrating exemplary hardware that can be used to implement the present invention on an electronic gaming device, according to an embodiment.

A processing unit, such as a microprocessor and associated structure (e.g., bus, cache, etc.), is connected to an output device 1301 (e.g., LCD, CRT, touch-screen, etc.) and an input device 1302 (e.g., touch-screen, keyboard, mouse, physical buttons, etc.) The processing unit 1300 can be configured and programmed to execute instructions that will implement any of the methods described herein on the electronic device. The processing unit 1300 can also be connected to a network connection 1303 which can connect the system to a computer communications network (e.g., Internet, LAN, WAN, etc.) The processing unit 1300 can also be connected to a ROM 1304 and a RAM 1305 and a storage device 1306 (e.g., BLU-RAY drive, hard disk drive, floppy disk drive, CD-ROM drive, etc.) and a non-transient computer readable storage medium 1307 (e.g., BLU-RAY disc, CD-ROM, EPROM, etc.) The computer readable storage medium 1307 can store instructions and assets in order to direct the processing unit 1300 to implement the methods described herein. The processing unit 1300 can also be connected to a payment acceptor 1308 which accepts consideration from the player in order to pay for the spins of the slot game.

The payment acceptor 1308 can be a bill acceptor, an electronic payment acceptor, a ticket (cashless voucher) reader, etc. The payment acceptor 1308 can also be a card reader which can read an electronic card which has an account number encoded on it, the account associated with the account number contains a respective number of Sweepstakes points which can be used to pay for the spins.

Also connected to the processing unit 1300 is a payment payer 1309 which, upon a cashout request by the player, issues the player actual payment for the amount of credits the player currently possesses. The payment payer can be a cash payment mechanism which actually dispenses cash or coins, or a ticket dispenser which dispenses a voucher which can be redeemed (at a cashier or clerk at the location) by the player for a respective amount of cash.

It is further noted that FIG. 13 describes components to the system however it is not necessary that all components be actually directly connected to the processing unit 1300. It is sufficient that the components are operationally connected (can work together with the processing unit) in order to effectuate their functions. In addition, instead of a single processing unit 1300, multiple processing units (not pictured) can be implemented.

The methods described herein can be implemented by any type of gaming system, e.g., a slot machine (video or mechanical) in a casino, a computer (personal computer or portable device) playing at an online casino over the Internet, and a game promotion/Sweepstakes system that uses Sweepstakes points to play, etc.

Figure 14:
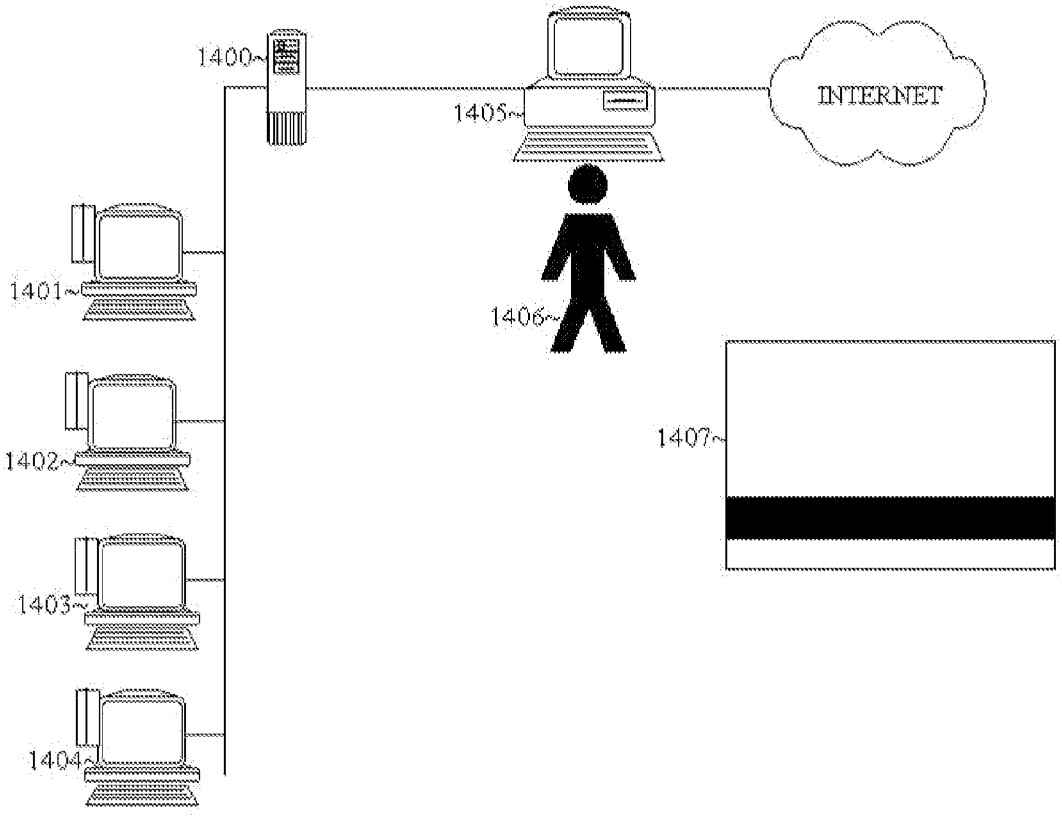
FIG. 14 is a block diagram illustrating hardware that can be used to implement a game on a Sweepstakes system, according to an embodiment.

FIG. 14 is a block diagram illustrating hardware that can be used to implement a game on a Sweepstakes system, according to an embodiment. Slot machine games and online casinos are well known in the art. Lesser known is the Sweepstakes parlor paradigm.

A "Sweepstakes parlor" can offer the game herein and can be implemented as follows. A server 1400 can distribute a finite pool of prizes across a number of winning and non-winning "tickets." This can be done periodically (e.g., every day before play is allowed). For example, a Sweepstakes distribution can be predefined as allocating 100 tickets, with 90 non-winning tickets (no award), 9 winning $5 and 1 winning $50. The winners/non-winners are randomized such that players cannot determine whether they are a winner/non-winners without actually playing the system.

A player (not pictured) can purchase a card 1407 (which can have for example phone time or other valuable goods or services) for cash from an attendant 1406. The attendant 1406 will activate the card 1407 using a workstation 1405 which can be connected to a computer communications network such as the Internet. The card in addition to having telephone time (or other value) can come with free Sweepstakes points (e.g., 100 points, each point good for one free spin of the game).

The player could then take the card 1407 to one of a plurality of game terminals 1401, 1402, 1403, 1404 which are in communication with the server 1400. Each game terminal has a card reader wherein the player can enter or swipe the card info 1407 so that the terminal can identify the account associated with the card 1407 and access the server 1400 to determine how many Sweepstakes points the card 1407 has associated with it. Sweepstakes points cannot be converted directly into cash but can be used to play the game described herein (or any other game) in which if the player wins an award the award is in the form of credits which can then be converted into cash (or prizes).

When the player has entered the card info 1407 and the system determines that the card has Sweepstakes points, the player can pay a predetermined number of sweepstakes points for each spin (play) of the game. That number of sweepstakes points would be deducted from the account associated with the card 1407 and the game begins (this is associated with operation 1200). In this embodiment, no "wager" is really made, instead Sweepstakes points are used to play the game and reveal the game outcome.

The potential win (in operation 1202) is determined by using the finite pool of prizes and selecting one such prize at random or sequentially. The actual symbols displayed on the game can be reverse mapped from the prize to determine which symbols to actually display.

When the player is done playing in the Sweepstakes embodiment, then the player can return to the attendant 1406 who can verify (using the card 1407) how many credits the player has won. The attendant 1406 can then issue the player cash in exchange for the credits (e.g., $0.01 for each credit), a prize based on the number of credits, or other award.

In this manner, the player is not really "wagering," but can instead purchase a phone card (or other item or service), receive free sweepstakes points, and then play the game at a terminal (typically on-site although they can also be located off-site) and win credits. The credits can then be exchanged on-site for cash.

Figure 15A:
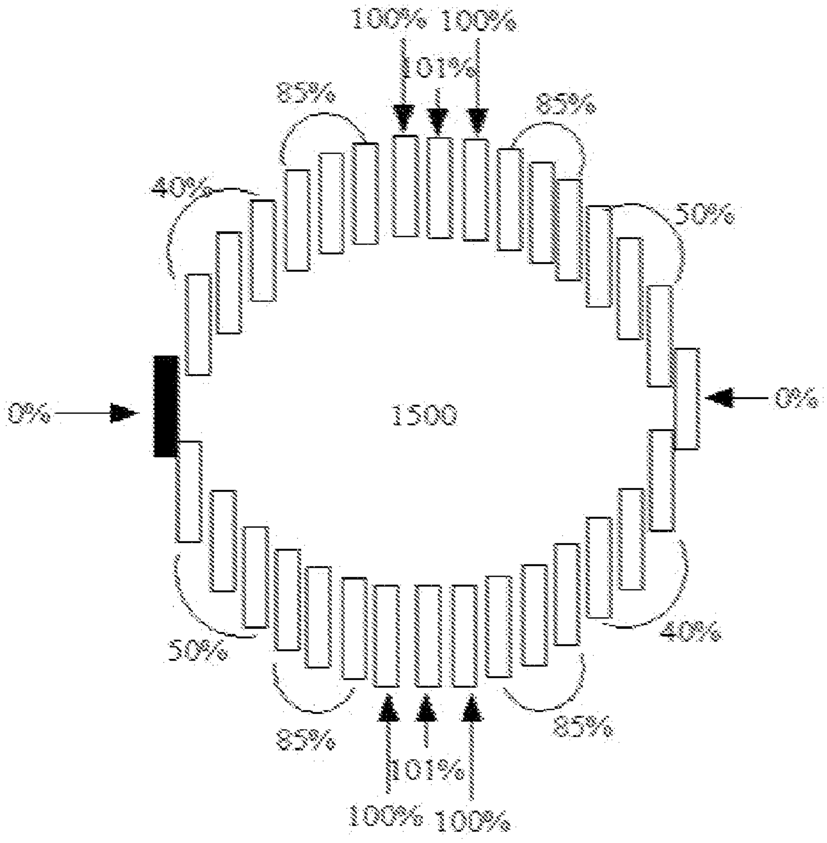
FIG. 15A is a figure illustrating a non-linear arrangement of bars, according to an embodiment.

FIG. 15A is a drawing illustrating a non-linear arrangement of bars, according to an embodiment.

Instead of the linear arrangement of bars illustrated in FIGS. 4-9, a non-linear arrangement can be used as well. In FIG. 15, the moving highlighted bar continuously moves around the circular arrangement 1500 (clockwise or counter clockwise) until the player presses the "stop" button and stops the moving bar (which becomes a frozen bar). The percentage associated with the frozen bar is the percentage of the potential award that the player wins. In this example, the highlighted bar would pay 0% (nothing) if the stop button were pressed at this location.

Other non-linear arrangements of bars can be used as well, such as ovals, half-circles, zig-zags, etc.

Instead of applying percentages, other relationships can be assigned to the bars to determine the actual award from the potential award.

Figure 15B:
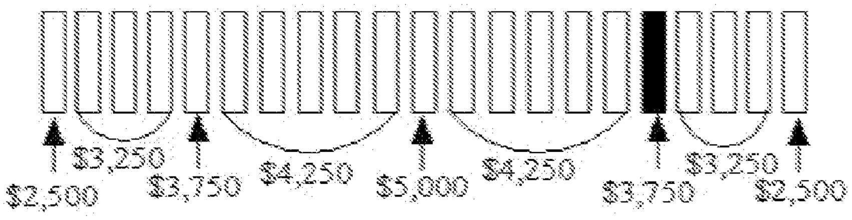
FIG. 15B is a drawing illustrating assigning prizes directly onto the bars.

FIG. 15B is a drawing illustrating assigning prizes directly onto the bars.

The actual awards can be displayed alongside the moving bar and so percentages do not even have to be displayed. For example, instead of displaying the percentages alongside the moving bars (as illustrated in FIG. 4), the actual award (prizes, winnings) amounts can be displayed alongside their respective bars. FIG. 15B illustrates actual awards associated with the bars instead of the percentages illustrated in FIG. 4, but the prizes (winnings) displayed in FIG. 15B are the percentages from FIG. 4 applied to a $5,000 potential award. In other words the percentages are directly applied to the potential award and directly displayed on the bars of the skill meter, thus the end result would be the same. In FIG. 15B, the frozen bar (since the player pressed the stop button) is at a bar where the player wins $3,750 (the actual award). Thus, the skill meter as displayed in FIG. 15B can be used in place of the skill meter illustrated in FIGS. 4-9.

Alternatively, the set of awards displayed alongside the bars can be determined using other functions of the actual award besides percentages.

Any description of a component or embodiment herein also includes hardware, software, and configurations which already exist in the prior art and may be necessary to the operation of such component(s) or embodiment(s).

Further, the operations described herein can be performed in any sensible order. Any operations not required for proper operation can be optional. Further, all methods described herein can also be stored on a computer readable storage to control a computer.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method to play a game on an electronic device, the method comprising:
- providing an input device, an output device, and a processing unit operationally connected to the input device and the output device;
- executing instructions on the processing unit to perform a following operations:
- receiving a wager from a player to play a wagering game;
- completing the wagering game on the output device to a game outcome;
- determining a potential award based on the game outcome;
- animating an icon until the player presses a stop button which causes the icon to become a frozen icon;
- determining an earned percentage based on a position of the frozen icon, wherein an optimal position of the frozen icon results in the earned percentage being a maximum possible percentage, wherein as the distance between the frozen icon and the optimal position increases, the earned percentage decreases;
- computing an actual award by applying the earned percentage to the potential award; and
- awarding the player the actual award.

2. The method as recited in claim 1, wherein wagering game is a reel slot machine game.

3. The method as recited in claim 2, wherein the wager comprises redeeming Sweepstakes points.

4. The method as recited in claim 1, wherein the maximum possible percentage is 100%.

5. The method as recited in claim 1, wherein the maximum possible percentage is more than 100%.

6. The method as recited in claim 1, wherein the icon is animated in a linear direction.

7. The method as recited in claim 1, wherein the icon is animated in a circular direction.

8. The method as recited in claim 1, wherein the completing the wagering game comprises spinning reels on a slot machine and the game outcome is a final position of the reels.

9. An apparatus to play a game, the apparatus comprising:
- an input device;
- an output device;
- a processing unit operationally connected to the input device and the output device, the processing unit configured to execute instructions to perform:
- receiving a wager from a player to play a wagering game;
- completing a game on the output device to a game outcome;
- determining a potential award based on the game outcome;
- animating an icon until the player presses a stop button which causes the icon to become a frozen icon;
- determining an earned percentage based on a position of the frozen icon, wherein an optimal position of the frozen icon results in the earned percentage being a maximum possible percentage, wherein as the distance between the frozen icon and the optimal position increases, the earned percentage decreases;
- computing an actual award by applying the earned percentage to the potential award; and
- awarding the player the actual award.

10. The apparatus as recited in claim 9, wherein wagering game is a reel slot machine game.

11. The apparatus as recited in claim 9, wherein the wager comprises redeeming Sweepstakes points.

12. The apparatus as recited in claim 9, wherein the maximum possible percentage is 100%.

13. The apparatus as recited in claim 9, wherein the maximum possible percentage is greater than 100%.

14. The apparatus as recited in claim 9, wherein the completing the game comprises spinning reels on a slot machine and the game outcome is a final position of the reels.

15. A method to play a game on an electronic device, the method comprising:

providing an input device, an output device, and a processing unit operationally connected to the input device and the output device;

executing instructions on the processing unit to perform a following operations:

receiving a wager from a player to play a wagering game;

completing the game on the output device to a game outcome;

determining a potential award based on the game outcome;

displaying a set of actual awards, the actual awards being determined as a function of the potential award;

animating an icon alongside the set of actual awards until the player presses a stop button which causes the icon to become a frozen icon;

determining an earned actual award based on which actual award of the set of actual awards corresponds to the frozen icon, wherein an optimal position of the frozen icon results in the earned actual award being a maximum award, wherein as the distance between the frozen icon and the optimal position increases, the earned actual award decreases; and awarding the player the earned actual award.

* * * * *